(12) United States Patent
Bize-Forest et al.

(10) Patent No.: US 11,814,931 B2
(45) Date of Patent: Nov. 14, 2023

(54) MACHINE-LEARNING FOR SEDIMENTARY FACIES PREDICTION

(71) Applicant: Schlumberger Technology Corporation, Sugar Land, TX (US)

(72) Inventors: Nadege Bize-Forest, Rio de Janeiro (BR); Laura Lima Angelo dos Santos, Rio de Janeiro (BR); Lucas Lima de Carvalho, Cachan (FR); Victoria Baines, Asker (NO); Austin Boyd, Rio de Janeiro (BR); Peter Schlicht, Bucharest (RO); Josselin Kherroubi, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 983 days.

(21) Appl. No.: 16/427,472

(22) Filed: May 31, 2019

(65) Prior Publication Data

US 2019/0368316 A1 Dec. 5, 2019

Related U.S. Application Data

(60) Provisional application No. 62/678,335, filed on May 31, 2018.

(51) Int. Cl.
*G06F 17/00* (2019.01)
*E21B 41/00* (2006.01)
(Continued)

(52) U.S. Cl.
CPC ............ *E21B 41/00* (2013.01); *G01V 99/005* (2013.01); *G06F 11/004* (2013.01);
(Continued)

(58) Field of Classification Search
CPC . G06N 20/00; E21B 41/0085; E21B 41/0092; E21B 49/00; E21B 47/04;
(Continued)

(56) References Cited

U.S. PATENT DOCUMENTS 4,646,240 A 2/1987 Serra et al.
9,274,249 B2 3/2016 Thorne
(Continued)

OTHER PUBLICATIONS

Siting Wei et al., A semi-supervised clustering ensemble approach integrated constraint-based & metric-based. In Proceedings of the 7th International Conference on Internet Multimedia Computing & Service. Association for Computing Machinery, 1-6. <https://doi.org/10.1145/2808492.2808518> Aug. (Year: 2015).*

(Continued)

*Primary Examiner* — Greta L Robinson
(74) *Attorney, Agent, or Firm* — Jeffrey D. Frantz

(57) ABSTRACT

Using machine learning for sedimentary facies prediction by using one or more logs acquired in a borehole. This includes performing a petrophysical clustering of borehole depths wherein the depths of the borehole are gathered into clusters based on similarities in the one or more logs. Also performed is a log inclusion optimization, including a selection of one or more parameters of the petrophysical clustering, wherein the one or more parameters include a number and/or type of considered logs among the one or more logs and/or a clustering method. Also performed is a classification of the clusters into core depositional facies using one or more predetermined rules.

20 Claims, 6 Drawing Sheets

(51) Int. Cl.

| | |
|---|---|
| *G06N 20/00* | (2019.01) |
| *G06Q 10/06* | (2023.01) |
| *G01V 99/00* | (2009.01) |
| *G06F 11/00* | (2006.01) |
| *G06F 16/35* | (2019.01) |
| *E21B 49/00* | (2006.01) |

(52) U.S. Cl.
CPC ........... *G06F 16/355* (2019.01); *G06N 20/00* (2019.01); *G06Q 10/06* (2013.01); *E21B 49/00* (2013.01)

(58) Field of Classification Search
CPC .. E21B 41/00; G01V 99/005; G01V 2200/16; G06F 11/004; G06F 16/355; G06Q 10/06
See application file for complete search history.

(56) References Cited

U.S. PATENT DOCUMENTS

| | | | | |
|---|---|---|---|---|
| 10,324,229 | B2* | 6/2019 | Theologou | G01V 99/005 |
| 10,725,189 | B2* | 7/2020 | Osypov | G01V 1/50 |
| 10,754,060 | B2* | 8/2020 | Borrel | G06V 10/44 |
| 10,942,293 | B2* | 3/2021 | Wiener | G01V 1/147 |
| 11,313,994 | B2* | 4/2022 | Salman | G06N 20/00 |
| 11,352,879 | B2* | 6/2022 | Li | G06N 20/20 |
| 2003/0200030 | A1* | 10/2003 | Meldahl | G01V 1/28 702/14 |
| 2006/0074825 | A1 | 4/2006 | Mirowski | |
| 2006/0092766 | A1* | 5/2006 | Shelley | G01V 11/00 367/72 |
| 2014/0149041 | A1* | 5/2014 | Sung | G01V 99/005 702/11 |
| 2021/0110280 | A1* | 4/2021 | Akkurt | G01V 5/12 |

OTHER PUBLICATIONS

Tibshirani, et al. (2001) Estimating the number of clusters in a data set via the gap statistic, J.R. Statist. Soc. B (2001) 63, Part 2, pp. 411-423.

Lim J.S., Kang J.M., Kim J., 1997, Multivariate Statistical Analysis for Automatic Electrofacies Determination from Well Log Measurements: SPE-38028-MS, presented at SPE Asia Pacific Oil and Gas Conference and Exhibition, Apr. 14-16, Kuala Lumpur, Malaysia. DOI: http://dx.doi.org/10.2118/38028-MS. (5 pages).

Qi L., Carr, T.R., 2005, Neural network prediction of carbonate lithofacies from well logs, Big Bow and Sand Arroyo Creek fields, Southwest Kansas: Computers & Geosciences, vol. 32/7, 947-964. DOI: http://dx.doi.org/10.1016/j.cageo.2005.10.020.

Tang H., 2008, Improved Carbonate Reservoir Facies Classification Using Artificial Neural Network Method: Canadian International Petroleum Conference/SPE Gas Technology Symposium 2008 Joint Conference, the Petroleum Society's 59th Annual Technical Meeting, Calgary, Alberta, Canada, Jun. 17-19, 2008. DOI: http://dx.doi.org/10.2118/2008-122. (10 pages).

Tang H., Meddaugh, W. S., and Toomey N., 2011, Using an Artificial-Neural-Network Method to Predict Carbonate Well Log Facies Successfully: 123988-PA SPE Journal Paper, vol. 14/1. 35-44. DOI: http://dx.doi.org/10.2118/123988-PA.

Dubois, Martin K., Geoffrey C. Bohling, and Swapan Chakrabarti. "Comparison of four approaches to a rock facies classification problem." Computers & Geosciences 33.5 (2007): 599-617.

Tall, Brendon. "Facies classification using machine learning." The Leading Edge 35.10 (2016): 906-909.

Hall, J., Ponzi, M., Gonfalini, M., & Maletti, G. "Automatic extraction and characterization of geological features and textures from borehole images and core photo-graphs". In SPWLA 37th Annual Logging Symposium. Society of Petrophysicists and Well-Log Analysts, 1996 (14 Pages).

Al-Sit, W., Al-Nuaimy, W., Marelli, M., & Al-Ataby, A. "Visual texture for automated characterization of geological features in borehole televiewer imagery". Journal of Applied Geophysics (2015), 119, 139-146.

Hurley, N. F., and Zhang, T. (2011). Method to generate full-bore images using borehole images and multipoint statistics. SPE Reservoir Evaluation & Engineering, 14(02), 204-214.

Zhang, T., Switzer, P., and Journel, A. (2006). Filter-based classification of training image patterns for spatial simulation. Mathematical Geology, 38(1), 63-80.

Al-Sit, W. (2015). Automatic feature detection and interpretation in borehole data. Doctoral dissertation, University of Liverpool.

Srivastava, N., Hinton, G., Krizhevsky, A., Sutskever, I., and Salakhutdinov, R. (2014). Dropout: a simple way to prevent neural networks from overfitting. The journal of machine learning research, 15(1), 1929-1958.

Ronneberger, O., Fischer, P., and Brox, T. (Oct. 2015). U-net: Convolutional networks for biomedical image segmentation. In International Conference on Medical image computing and computer-assisted intervention (pp. 234-241). Springer, Cham.

Van der Maaten, L., and Hinton, G. (2008). Visualizing data using t-SNE. Journal of machine learning research, 9(11), 2579-2605.

LeCun, Y. (1989). Generalization and network design strategies. In Connectionism in perspective (vol. 19). Amsterdam: Elsevier.(16 pages).

Wattenberg, M., Viegas, F., and Johnson, I. (2016). How to use t-SNE effectively. Distill, 1(10), e2, downloaded from link https://distill.pub/2016/misread-tsne/ on Apr. 24, 2023 (26 pages).

Goodfellow, I., Bengio, Y., and Courville, A. (2016). Deep Learning. Cambridge, MA, USA: MIT Press, , Chapter 14, pp. 499-501.

* cited by examiner

MACHINE-LEARNING FOR SEDIMENTARY FACIES PREDICTION

CROSS-REFERENCE TO RELATED APPLICATIONS

This application claims priority to and the benefit of U.S. Provisional Application No. 62/678,335, titled "Machine-Learning for Sedimentary Facies Prediction," filed May 31, 2018, the entire disclosure of which is hereby incorporated herein by reference.

BACKGROUND OF THE DISCLOSURE

Supervised learning methods are used with measurements logs to predict depositional or sedimentary facies described in cores. That is, a model is built/learned from labeled training data, and the model is then used for the prediction. However, for heterogeneous formations affected by diagenesis and/or fracturation, there can be a nonlinear relationship between geological facies and log parameters, such that conventional supervised clustering techniques may not provide accurate results.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 5-7 are plots depicting one or more aspects pertaining to the present disclosure.

DETAILED DESCRIPTION

Figure 1:
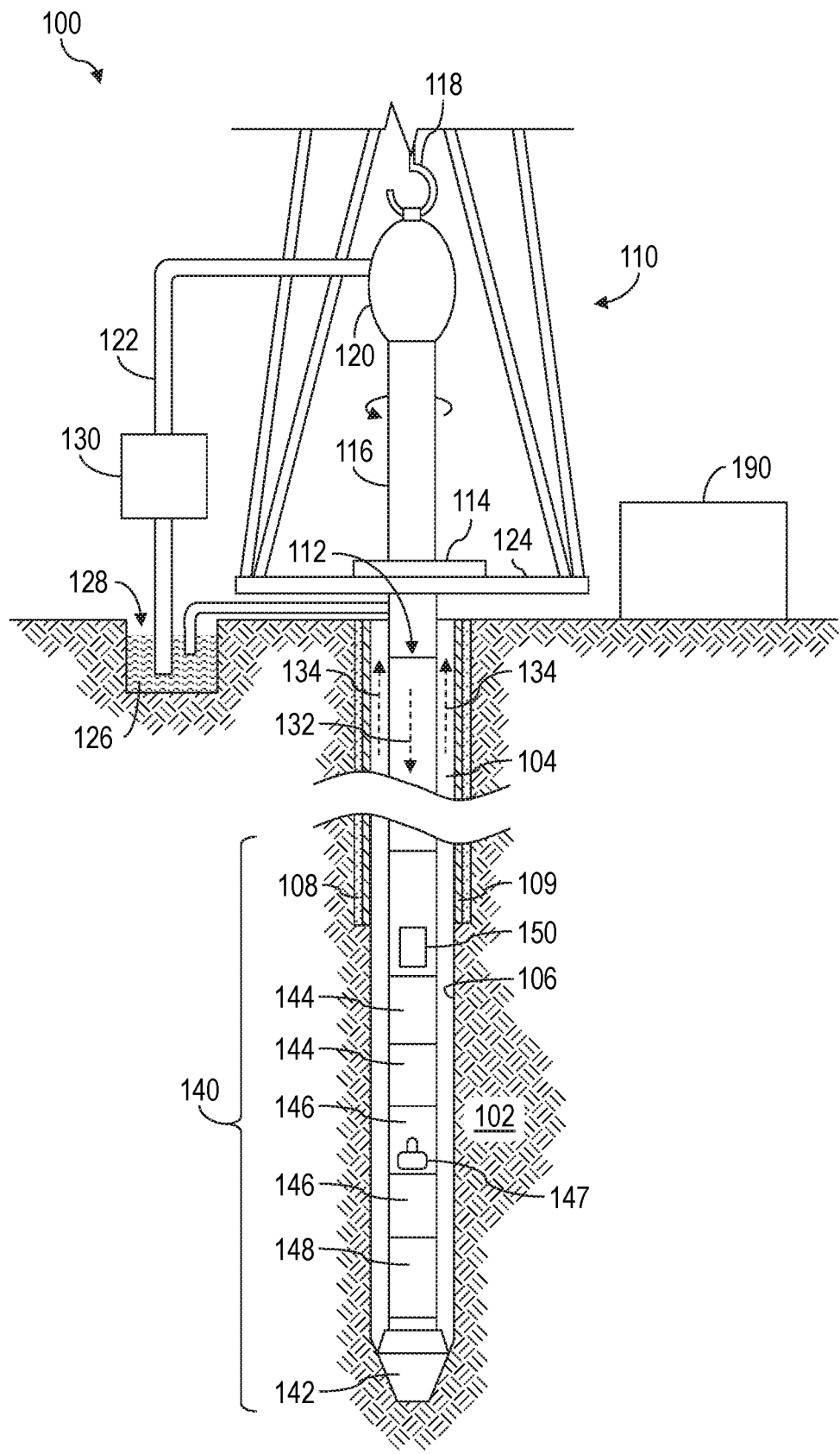
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of an example wellsite system 100 to which one or more aspects of the present disclosure may be applicable. The wellsite system 100 may be onshore or offshore. In the example wellsite system 100 shown in FIG. 1, a borehole 104 is formed in one or more subterranean formations 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or instead of, those presently illustrated and described.

As shown in FIG. 1, a drillstring 112 suspended within the borehole 104 comprises a bottom hole assembly (BHA) 140 that includes or is coupled with a drill bit 142 at its lower end. The surface system includes a platform and derrick assembly 110 positioned over the borehole 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. The drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the borehole 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the borehole 104. For example, the BHA 140 may comprise one or more logging-while-drilling (LWD) modules 144, one or more measurement-while-drilling (MWD) modules 146, a rotary-steerable system and motor 148, and perhaps the drill bit 142. Other BHA components, modules, and/or tools are also within the scope of the present disclosure, and such other BHA components, modules, and/or tools may be positioned differently in the BHA 140 than as depicted in FIG. 1.

The LWD modules 144 may comprise one or more devices for measuring characteristics of the formation 102, obtaining a sample of fluid from the formation 102, and/or measuring porosity, density, saturation, permeability, density, dimensions of the borehole, and/or other characteristics via electromagnetic, nuclear, acoustic, and/or other sensors. The devices are operable for and/or otherwise permit obtaining logs of one or more characteristics of the formation. The logs generally represent at least a characteristic of the formation versus depth.

The MWD modules 146 may comprise one or more devices for measuring characteristics of the drillstring 112 and/or the drill bit 142, such as for measuring weight-on-bit, torque, vibration, shock, stick slip, tool face direction, and/or inclination, among other examples. The MWD modules 146 may further comprise an apparatus 147 for generating electrical power to be utilized by the downhole system, such as a mud turbine generator powered by the flow of the drilling fluid 126. Other power and/or battery systems may also or instead be employed. One or more of the LWD modules 144 and/or the MWD modules 146 may be or comprise at least a portion of a packer tool as described below.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
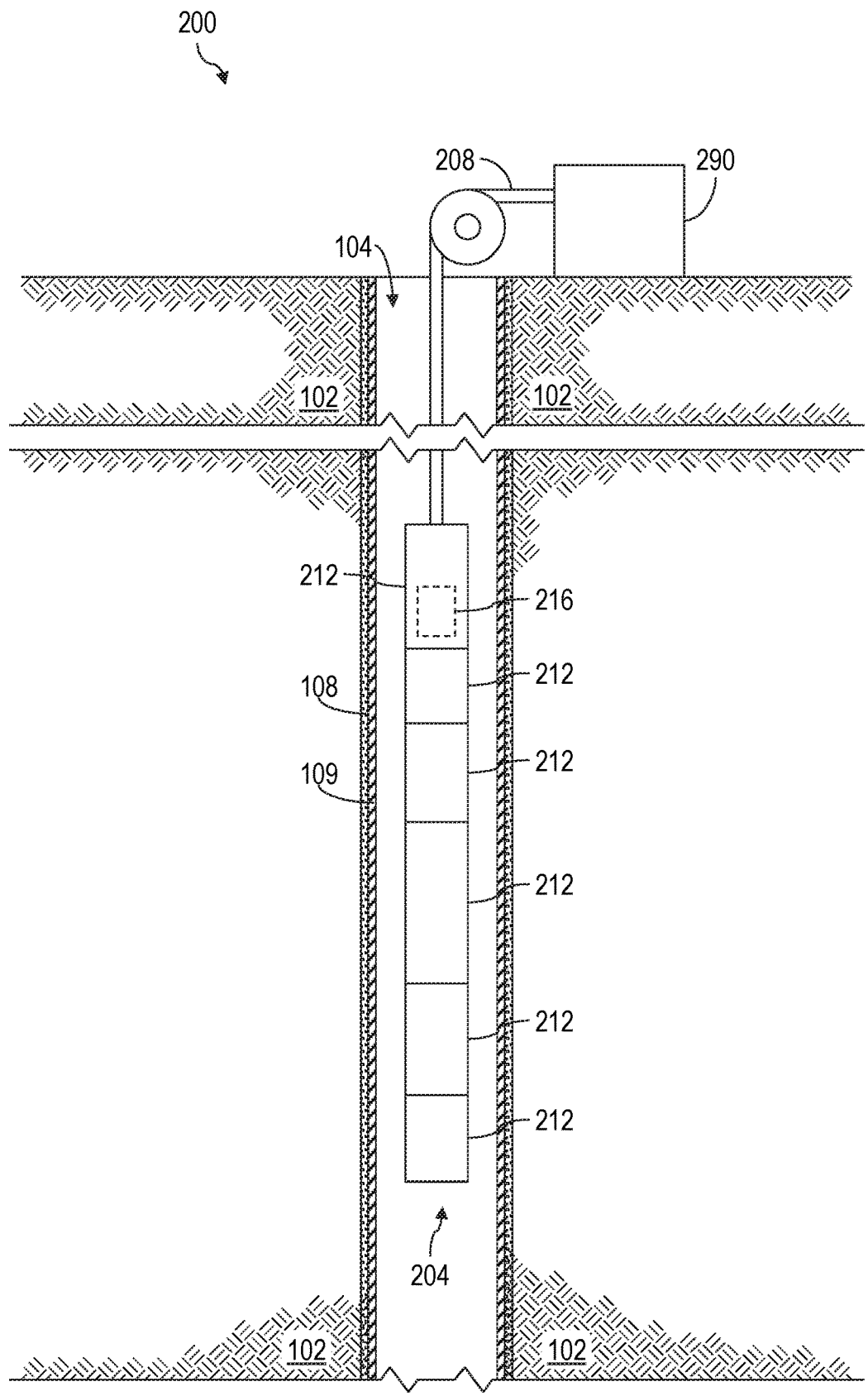
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the borehole 104 via a wireline and/or other conveyance means 208. As with the wellsite system 100 shown in FIG. 1, the example wellsite system 200 of FIG. 2 may be utilized for evaluation of the borehole 104, the cement 108 securing the casing 109 within the borehole 104, and/or the formation 102 penetrated by the borehole 104.

The tool string 204 is suspended in the borehole 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of a device for measuring a characteristic of the formation as described above, and/or a device for obtaining a sidewall or inline core sample of the formation 102. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. For example, such data processing system may include processor capability for collecting acoustic, ultrasonic, and/or other data related to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a borehole, other example implementations consistent with the scope of this disclosure may utilize other conveyance means to convey a tool into a borehole, including coiled tubing, tough logging conditions (TLC), slickline, and others. Additionally, other downhole tools within the scope of the present disclosure may comprise components in a non-modular construction also consistent with the scope of this disclosure.

The present disclosure introduces a workflow to identify depositional facies in a complex reservoir from logs, using multiple clustering methods combined in machine learning. As described above, supervised learning methods can be used with measurements logs to predict depositional or sedimentary facies described in cores. However, for heterogeneous formations affected by diagenesis and/or fracturation, there can be a nonlinear relationship between geological facies and log parameters, such that conventional supervised clustering techniques may not provide accurate results. The challenge to identify the original sedimentary or depositional facies (e.g., prior to diageneses or fracturation) is often unresolved, because the same depositional facies can be affected by different diagenesis processes over time, resulting in reservoir rock types (RRTs) with different petrophysical properties. The interrelationships between depositional facies and petrophysical logs are not straightforward, and conventional training or supervised methods may not be successful for depositional facies prediction.

The workflow introduced herein for sedimentary or depositional facies prediction combines data preparation, supervised and unsupervised learning methods, and probabilistic algorithms. The workflow comprises (1) data preparation, such as one or more of normalization, depth-matching, facies border removal, handling missing data, balancing unbalanced data sets, and handling outliers, among other examples. The workflow also comprises (2) simultaneous application of several supervised learning (e.g., clustering) methods using the full suite of available logs to (a) identify which training method clusters best against core depositional facies and (b) define the optimum log combination. This may entail the application of several supervised clustering methods in order to define optimum log combination and optimal supervised method that best match the clusters for a particular type of formation. The workflow also comprises (3) application of an unsupervised clustering method equivalent to the identified (from (2)(a)) supervised method on the optimum (from (2)(b)) set of input logs to define petrophysical clusters. This may entail the application of an unsupervised method to select the best input of logs to define the petrophysical clusters of the particular type of formation with rules defined in (2). The workflow may also comprise (4) comparison of the petrophysical clusters with the core depositional facies, such as to find rules and/or occurrences regarding frequency, stratigraphic distributions, thickness, and likely patterns, and/or to assign the clusters to particular sedimentary facies. The workflow has been tested on heterogeneous carbonate formations from different reservoirs and, after assigning petrophysical clusters to the depositional facies, performance tests for predicting the depositional facies were increased by more than 20%.

Figure 3:
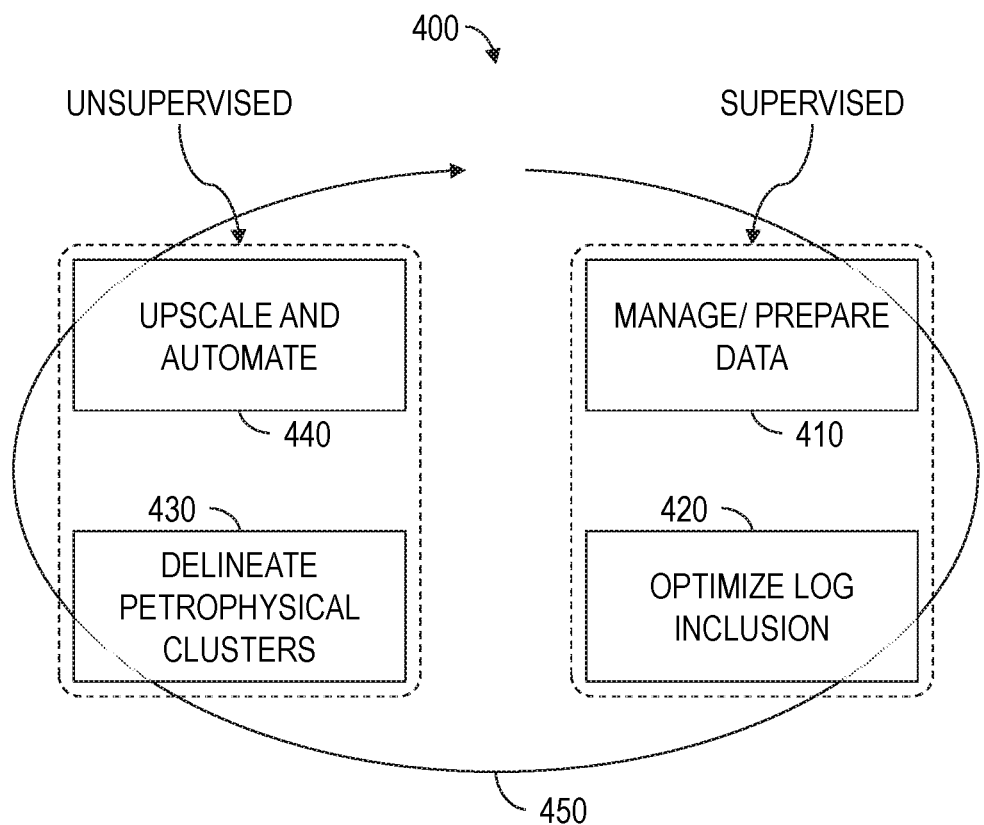
FIG. 3 is a graphical depiction of at least a portion of an example implementation of a workflow/method according to one or more aspects of the present disclosure.

Data sets utilized as inputs to the facies prediction workflow include (1) classes of sedimentary facies, depositional facies, and/or lithology facies described on one or more cores to be reproduced, and (2) petrophysical properties as logs or core data. An example implementation of at least a portion of a method 400 for the workflow is depicted in FIG. 3. The method/workflow 400 includes data management and preparation 410, log inclusion optimization 420, petrophysical clustering 430, and upscaling and automation 440, all combined in machine-learning 450. The data management and preparation 410 and the log inclusion optimization 420 may be/comprise supervised methods, whereas the petrophysical clustering 430 and the upscaling and automation 440 may be/comprise unsupervised methods.

The data management and preparation 410 may include one or more of depth matching and resampling, data normalization and outlier handling, missing data handling, and balanced data set distribution. For example, inclusion of each of these processes during experimentation has resulted in a 5-7% increase in performance. However, the data management and preparation 410 may be optional, may comprise just part of the processes as described below, and/or may include known and/or future-developed data preparation methods instead of or in addition to the processes described herein.

For the depth matching and resampling, logs may be depth-shifted against a reference log, such as a gamma ray (GR) log (which is a well-known reference log). Core facies descriptions may be depth-matched by comparing the core GR to the reference log GR or accurately depth-matched using image logs, if available. The depth matching and resampling may be performed with the objective of not losing information extracted from a high-resolution log, and the sampling rate of the data set may correspond to the log with the smallest vertical resolution.

For the data normalization and outlier handling, well logs and calculated curves may be normalized using the RANGE [0,1] Min-Max Normalization. The normalization may be either linear or logarithmic (e.g., for permeability and resistivity logs). If extreme values or outliers that can bias the normalization are observed, a predetermined percentile of outliers may be collapsed into the first and the last categories or bins of the normalized measurement. For the studied data set, the percentile of outliers to consider in normalization may be set to 5% (for example), such that the first 5% and the last 5% of the data are dropped into the respective first and last categories/bins. The remaining data may be normalized with a linear or logarithmic scale.

With regard to the missing data handling, missing data may correspond either to absent values at a given depth or absence of one of the logs or curves for a well. Absent values representing less than a predetermined percentage (e.g., 1%) of the data set may be discarded from the training data set without significantly affecting the accuracy of the training model. However, absence of a measurement or log in a particular well may result in discarding the entire well data set from the training set. Thus, to not lose all information carried by one well, the missing data handling may comprise reconstructing a missing log or measurement. For example, a petrophysical log may be reconstructed from other petrophysical measurements using one or more supervised learning algorithms or, depending on the type of petrophysical measurement, can be determined using empirical equations, among other examples.

For the balanced data set distribution, it is noted that some training methods minimize the overall error, such that the relative proportion of core facies to predict may be critical. To avoid biased statistics during the modeling, an unbalanced data set may be corrected using a weighted average method. For example, a supervised learning method may be utilized with a data set corrected with the weighted average method and the raw data set. Performance scores of the two models may be compared to evaluate whether the weighted method increases the accuracy of the supervised modeling.

The log inclusion optimization 420 identifies which training method clusters the best against the core depositional facies and defines the optimum input combination of logs to use. In the context of the present disclosure, the term "supervised" refers to a set of samples where the desired output signals (label) and the predictive variables (logs and derived statistics) are already known. Several supervised learning methods may be run simultaneously using the full suite of logs to predict the core facies. Examples of supervised clustering techniques that can be used are SVM Gaussian, Random Forest, Neural Network, Naïve Bayes, and k-nearest neighbors, among other examples also within the scope of the present disclosure.

Figure 4:
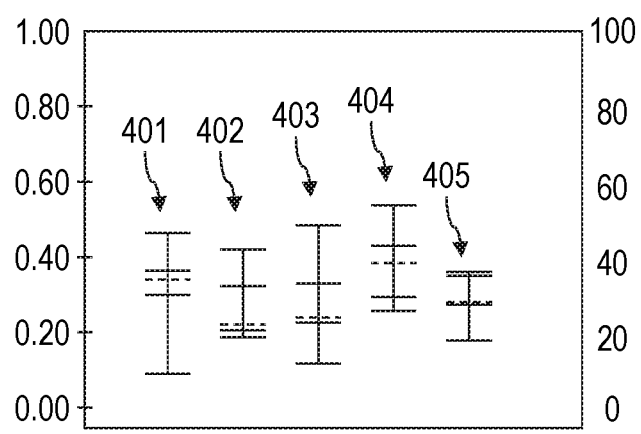
FIG. 4 is a graph depicting one or more aspects pertaining to the present disclosure.
Figures 5, 6:
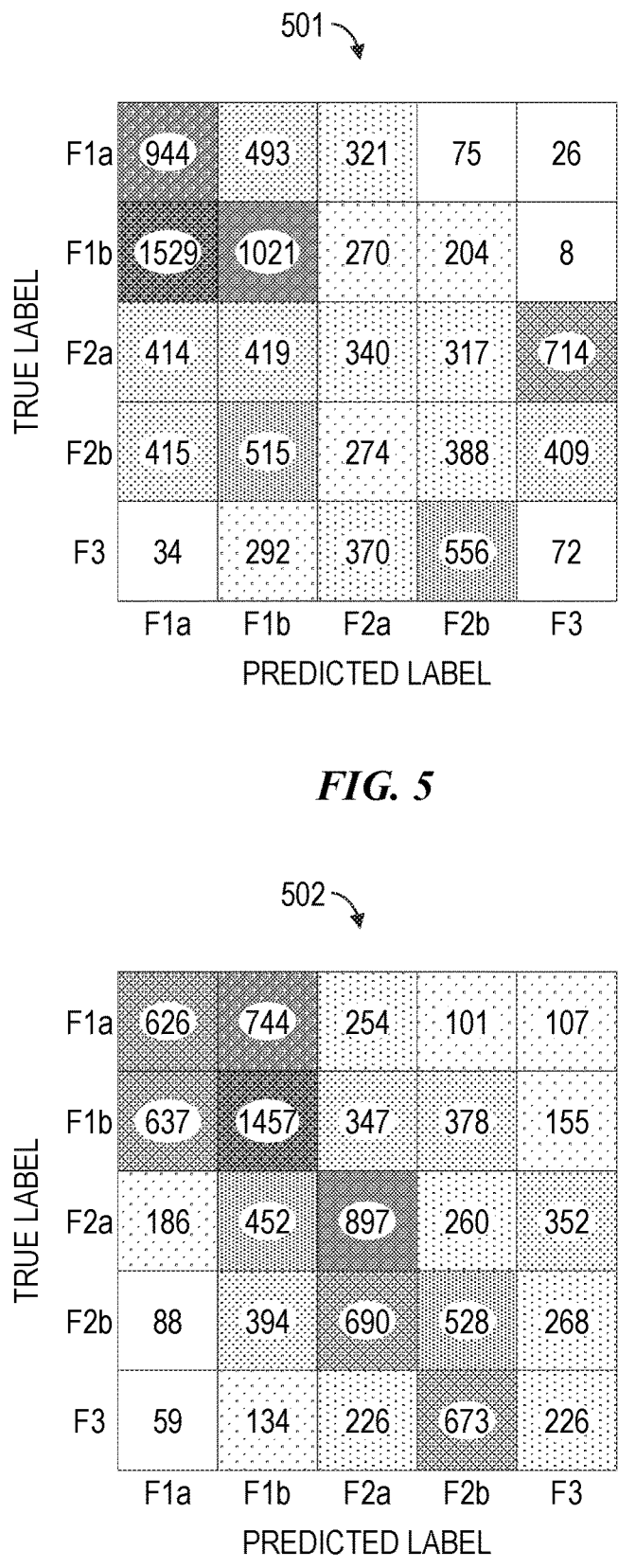
Figure 7:
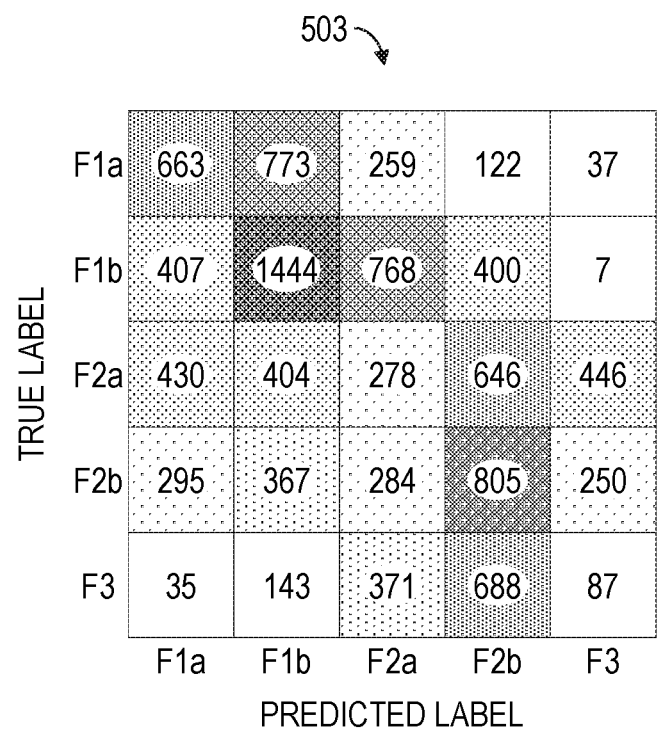

The validation protocol used in the workflow may be the k-fold cross-validation. For example, the model may be trained on k (−X) wells and validated on X wells. The procedure is repeated k times to give the chance for each well to be part of the training data set and be part of the testing data at least once. Performance tests or accuracy scores (e.g., median, mean, and variance) average the k repeated experiments for each of the supervised methods. Examples are depicted in FIGS. 4-7. FIG. 4 is an example box-plot showing accuracy tests median (dashed line), maximum, minimum, and quartiles for each of several supervised clustering techniques, including SVM Gaussian 401, Random Forest 402, Neural Network 403, Naïve Bayes 404, and k-nearest neighbors 405, to predict five facies with 26 logs. Related thereto, FIG. 5 is an example confusion matrix 501 for Random Forest clustering, FIG. 6 is an example confusion matrix 502 for Naïve Bayes clustering, and FIG. 7 is an example confusion matrix 503 for KNN classifiers (k-nearest neighbor) clustering. Each confusion matrix 501-503 displays the number of correct predicted facies (predicted label) for each core facies (true label) and can be used to visualize the performance of each supervised method. Each confusion column of the confusion matrices 501-503 represents the instances in a predicted class, while each row represents the instances in an original facies. Correct predictions are located on the diagonal, making it easy to visually inspect the matrices 501-503 for prediction errors, because they will be represented by values outside the diagonal. Each facies may be predicted and represented in the matrices 501-503.

Figure 8:
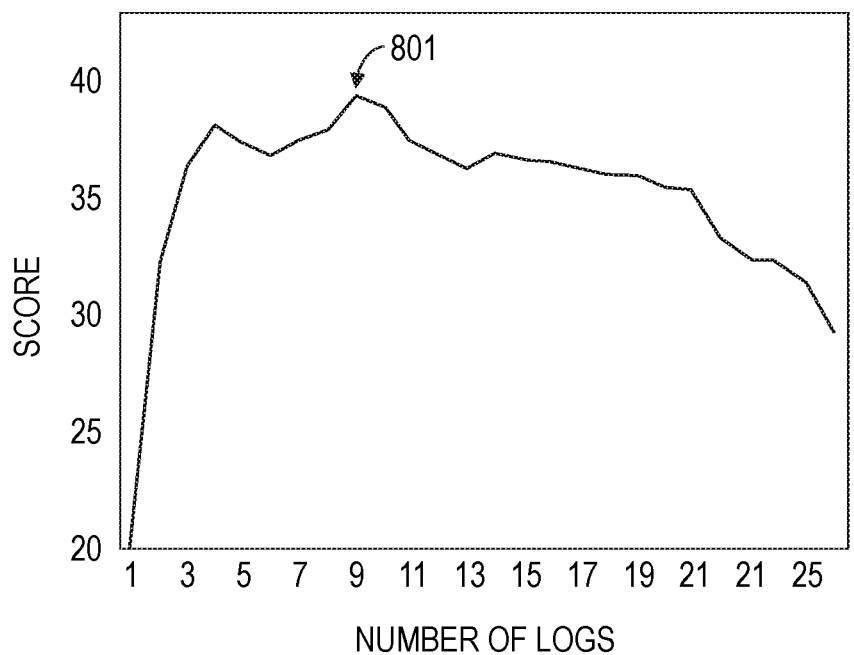
FIGS. 8 and 9 are graphs depicting one or more aspects pertaining to the present disclosure.

Identifying 420 the optimum combination of input logs using the optimum supervised learning method entails reducing the dimension of the system and identifying the input logs that more substantially aid in discriminating the depositional facies. Elbow plots may be used to show accuracy test scores when combining each log data to another. FIG. 8 depicts an example in which a combination of nine logs results in the highest score 801 (39%) to discriminate the depositional facies, and in which adding more logs decreases the score.

The petrophysical clustering 430 delineates petrophysical clusters using an unsupervised method performed with the identified 420 optimum combination of logs and finds rules to assign one or more petrophysical clusters to the core depositional facies. The identified optimum clustering technique or method is consequently run in unsupervised mode using the optimum combination of logs.

Figure 9:
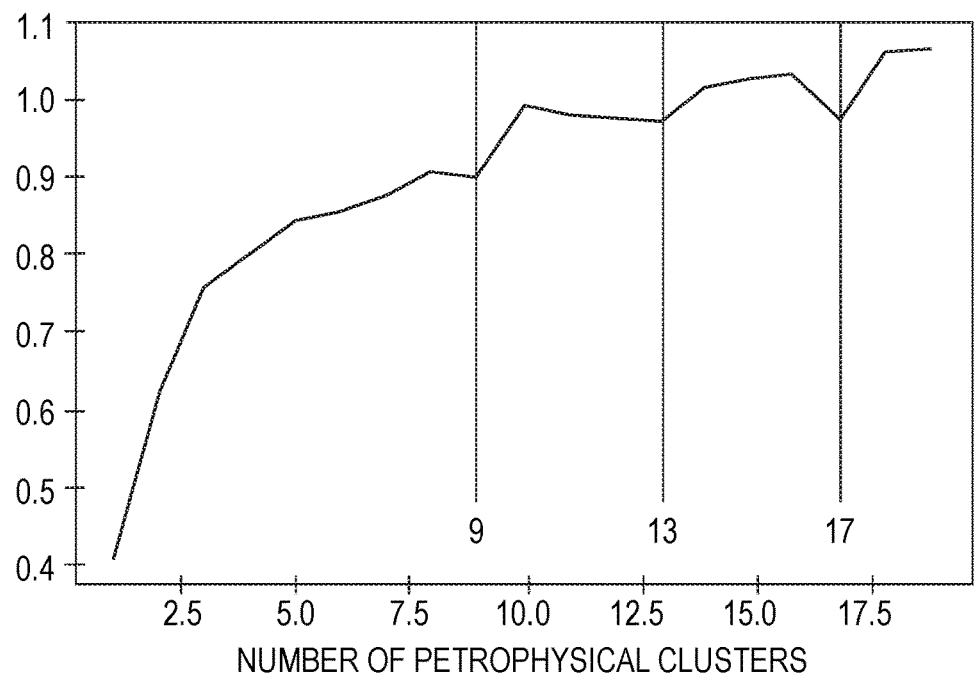

The optimum number of petrophysical clusters may be estimated using, for example, the "gap statistic" proposed by Tibshirani, et al. (2001). It corresponds to the largest gap between the value of point dispersion on a uniform dataset and the actual point dispersion. The optimal number of clusters can be read on a gap statistic plot, and corresponds to the lowest points. In the example depicted in FIG. 9, the optimal number of clusters corresponds to the lowest points, namely, nine, thirteen, and seventeen clusters. For a simple model, nine clusters may be sufficient to cluster all data. For more detailed models, seventeen clusters may be used. In this case, this workflow data set is clustered into the maximum number of classes.

The upscaling and automation 440 (also referred to as classification of the clusters) classifies the petrophysical clusters into core depositional facies using one or more classification rules. Statistics and probability codes are used to set up the rules, such as may include a rule of occurrence, a rule of thickness, a rule of stratigraphic position, and a rule of likely pattern.

The occurrence rule is based on the probability of one predicted cluster corresponding to one depositional facies. A co-occurrence matrix in percentage may be used to show the probability of each petrophysical cluster to match one core facies. When the probability is 100%, the petrophysical cluster is automatically reclassified in one core facies. When the probability is below 100%, a predetermined (or real-time selected) threshold may be used, such that for probabilities above the threshold, the petrophysical cluster is reclassified in one core facies, and for probabilities below the threshold, the thickness, stratigraphic position, and likely pattern rules are applied to the petrophysical clusters.

The thickness rule is applied for predicted facies corresponding to thin layers (e.g., having a thickness less than five centimeters) or to layers with few continuous data samples. These petrophysical clusters may be automatically assigned to the depositional facies above or below which has the larger thickness.

The stratigraphic rule can be applied when the formation is divided in stratigraphic intervals with specific depositional facies. Statistics for depositional facies distribution may be run per stratigraphic intervals. The probability of the petrophysical cluster to match one core facies is then weighted depending on the stratigraphic intervals to which it belongs. For example, cluster X shows 55% probability to correspond to Facies F1 and 45% probability to correspond to F2. If it belongs to a stratigraphic interval where F1 is absent, considering the full data set, X has more probability to be classified in F2 than in F1.

The likely pattern rule identifies a number of statistically significant patterns or sequences of the core depositional facies. It shows whether one facies has a better chance to be above or below another one. For example, a contingency table of the core depositional facies and Fisher's exact test may be used to show the evidence for a specific pattern or sequences. Fisher's exact test considers the null hypothesis that the appearance of the two core depositional facies is independent. It then calculates the odds ratio of the contingency table and determines the likelihood that, under the null hypothesis, an odds ratio would be obtained that was at least as extreme as that observed in the contingency table. For example, a cluster X is above Facies F3 and shows 55% probability to correspond to Facies F1 and 45% probability to correspond to F2. If the sequence F3-F1 is never seen in the entire data set, or F3-F2 is a likely pattern, X has more probability to be classified in F2 than in F1.

For isolated petrophysical clusters which do not correspond to any core depositional facies, they either correspond to a new depositional facies, not observed in the training set cores, or to outliers of an existing core facies. If the number of samples found in isolated petrophysical clusters is high comparatively to the full dataset, a new depositional facies is created. If the number of samples is small, the rules of thickness or stratigraphic position are applied, which reassigns them to the depositional facies above or below.

A performance test may run after applying the rules and may give the final score of the depositional facies predicted model.

Thus, the method 400 described above may entail the application of several supervised clustering methods in order to define an optimum log combination and an optimal supervised method to match the clusters best for one particular type of formation. Such rules may be utilized for applying an unsupervised method to the selected best input of logs to define the petrophysical clusters of the particular type of formation. Rules and occurrences may be applied to match clusters with facies in view of the occurrence, thickness of the layer, and other parameters.

Figure 10:
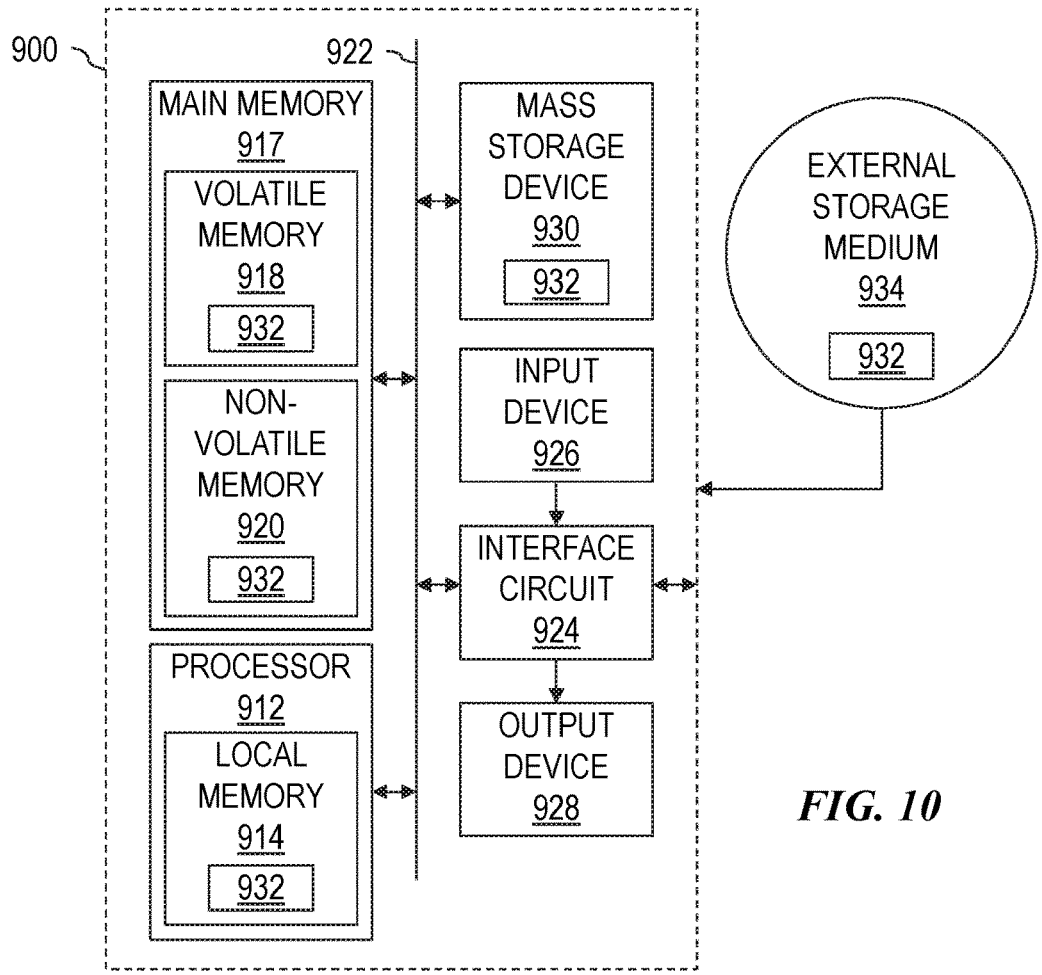
FIG. 10 is a schematic view of at least a portion of an example implementation of apparatus according to one or more aspects of the present disclosure.

FIG. 10 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. The entirety or a portion of the processing system 900 may be implemented within downhole apparatus described above, including for performing at least a portion of the method 400 shown in FIG. 3 and/or other aspects described above. For example, at least a portion of the processing system 900 shown in FIG. 10 may be utilized in the environment of FIGS. 1 and/or 2 in conjunction with sedimentary facies prediction according to one or more aspects of the present disclosure. One or more components or functions of the processing system 900 may also or instead be implemented in wellsite surface equipment, perhaps including the surface equipment 190 depicted in FIG. 1, the surface equipment 290 depicted in FIG. 2, and/or other surface equipment.

The processing system 900 may comprise a processor 912, such as a general-purpose programmable processor, for example. The processor 912 may comprise a local memory 914, and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third-generation input/output (3GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a track-pad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD or DVD.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising using machine learning for sedimentary facies prediction by using one or more logs acquired in a borehole, by performing: a petrophysical clustering of borehole depths wherein the depths of the borehole are gathered into clusters based on similarities in the one or more logs; a log inclusion optimization, including a selection of one or more parameters of the petrophysical clustering, wherein the one or more parameters include a number and/or type of considered logs among the one or more logs and/or a clustering method; and a classification of the clusters into core depositional facies using one or more predetermined rules.

The method may comprise performing data management before the petrophysical clustering, wherein the data management may comprise depth matching and/or resampling. The depth matching and/or resampling may comprise: depth-shifting measurement logs against a GR or other reference log; and depth-matching core facies descriptions by comparing a core GR to the reference log and/or using image logs.

The method may comprise performing data management before the petrophysical clustering, wherein the data management may comprise data normalization and/or outlier handling. The data normalization and/or outlier handling may comprise: normalizing well logs and/or calculated curves; and/or collapsing a predetermined percentile of outliers into first and last categories or bins of the normalized measurement.

The method may comprise performing data management before the petrophysical clustering, wherein the data management may comprise missing data handling. The missing data handling may comprise discarding absent values representing less than a predetermined percentage of the data. The missing data handling may also or instead comprise reconstructing a petrophysical log from other petrophysical measurements using one or more supervised learning algorithms or via computation using empirical equations.

The method may comprise performing data management before the petrophysical clustering, wherein the data management may comprise balanced data set distribution. The balanced data set distribution may comprise correcting unbalanced data using weighted averaging.

The method may comprise data management before the petrophysical clustering, wherein the data management comprises: depth matching and/or resampling; data normalization and/or outlier handling; missing data handling; and balanced data set distribution. The depth matching and/or resampling may comprise: depth-shifting measurement logs against a GR or other reference log; and depth-matching core facies descriptions by comparing a core GR to the reference log and/or using image logs. The data normalization and/or outlier handling may comprise: normalizing well logs and/or calculated curves; and collapsing a predetermined percentile of outliers into first and last categories or bins of the normalized measurement. The missing data handling may comprise discarding absent values representing less than a predetermined percentage of data. The missing data handling may also or instead comprise reconstructing a petrophysical log from other petrophysical measurements using one or more supervised learning algorithms or via computation using empirical equations. The balanced data set distribution may comprise correcting unbalanced data using weighted averaging.

The log inclusion optimization may identify which clustering method clusters best against core depositional facies and defines an optimum input combination of logs to use among the one or more logs to cluster best against core depositional facies. The log inclusion optimization may identify the best clustering method by testing one or more clustering methods in a supervised mode, comparing the output of a clustering method with reference clustering output, and selecting the best clustering method based on the comparison.

The petrophysical clustering may delineate petrophysical clusters using an unsupervised mode. The number of clusters may be defined using a gap statistic operation.

The one or more rules may include one or more of: an occurrence rule; a thickness rule; a stratigraphic position rule; and a likely pattern rule. The occurrence rule may be based on probability of one predicted cluster corresponding to one depositional facies, and the probability may be compared to a predetermined threshold. The thickness rule may be applied for predicted facies corresponding to thin layers or to layers with few continuous data samples, and automatically assigns these petrophysical clusters to depositional facies above or below which has the larger thickness. The stratigraphic position rule may be applied when a formation is divided in stratigraphic intervals with specific depositional facies and may be based on weighted probability of a petrophysical cluster matching one core facies. The likely pattern rule may assign petrophysical clusters based on statistically significant patterns or sequences of core depositional facies.

The prediction may further include: running a performance test after applying all rules; and generating a final score of the depositional facies predicted model.

The present disclosure also introduces a method comprising using machine learning for sedimentary facies prediction by using one or more logs acquired in a borehole, by performing one or more of: a petrophysical clustering of borehole depths, wherein the depths of the borehole are gathered into clusters based on similarities in the one or more logs; a log inclusion optimization, including a selection of one or more parameters of the petrophysical clustering, wherein the one or more parameters include a number and/or type of considered logs among the one or more logs and/or a clustering method; and a classification of the clusters into core depositional facies using one or more predetermined rules.

The method may further include data management and/or preparation of data before the petrophysical clustering, wherein the data management and/or preparation includes one or more of: depth matching and/or resampling; data normalization and/or outlier handling; missing data handling; and balanced data set distribution. The depth matching and/or resampling may comprise one or more of: depth-shifting measurement logs against a reference log, such as a gamma ray (GR) log; and depth-matching core facies descriptions by comparing a core GR to the reference log and/or using image logs. The data normalization and/or outlier handling may comprise one or more of: normalizing well logs and/or calculated curves; and collapsing a predetermined percentile of outliers into first and last categories or bins of the normalized measurement. The missing data handling may comprise discarding absent values representing less than a predetermined percentage (e.g., 1%) of the data set. The missing data handling may comprise reconstructing a petrophysical log from other petrophysical measurements, such as by using one or more supervised learning algorithms or, depending on the type of petrophysical measurement, via computation using empirical equations. The balanced data set distribution may comprise correcting an unbalanced data set using weighted averaging.

The log inclusion optimization may identify which clustering method clusters best against core depositional facies and may define an optimum input combination of logs to use among the one or more logs to cluster best against core depositional facies. The log inclusion optimization may identify the best clustering method by testing one or more clustering methods in a supervised mode, comparing the output of a clustering method with reference clustering output, and selecting the best clustering method based on the comparison.

The petrophysical clustering may delineate petrophysical clusters using an unsupervised mode. The number of clusters may be defined using a gap statistic operation.

The one or more rules may include one or more of: an occurrence rule; a thickness rule; a stratigraphic position rule; and a likely pattern rule. The occurrence rule may be based on probability of one predicted cluster corresponding to one depositional facies, and the probability may be compared to a predetermined threshold. The thickness rule may be applied for predicted facies corresponding to thin layers or to layers with few continuous data samples and may automatically assign these petrophysical clusters to depositional facies above or below which has the larger thickness. The stratigraphic position rule may be applied when a formation is divided in stratigraphic intervals with specific depositional facies and may be based on weighted probability of a petrophysical cluster matching one core facies. The likely pattern rule may assign petrophysical clusters based on statistically significant patterns or sequences of core depositional facies.

The prediction may further include running a performance test after applying the rules and generating a final score of the depositional facies predicted model.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method comprising:
    using machine learning for sedimentary facies prediction based on one or more logs acquired in a borehole, by performing, via one or more processors of a computing system:
        data management comprising:
            depth matching or resampling, comprising:
                depth-shifting measurement logs against a gamma ray (GR) or other reference log; and
                depth-matching core facies descriptions by comparing a core GR to the GR log or the other reference log or using image logs;
            data normalization and outlier handling, comprising:
                normalizing well logs or calculated curves; and
                collapsing a predetermined percentile of outliers into first and last categories or bins of the normalized well logs or calculated curves;
            missing data handling comprising:
                discarding absent values representing less than a predetermined percentage of data; and
                reconstructing a petrophysical log from other petrophysical measurements using one or more supervised learning algorithms or via computation using empirical equations; and
            balanced data set distribution comprising correcting unbalanced data using weighted averaging;
        a petrophysical clustering of borehole depths, wherein the borehole depths are gathered into clusters based on similarities in the one or more logs using an unsupervised learning technique, wherein the one or more logs represent formation characteristics versus depth, and wherein the data management is performed before the petrophysical clustering;
        a log inclusion optimization, including a selection of one or more parameters of the petrophysical clustering using a supervised learning technique, wherein the one or more parameters include a number and type of considered logs among the one or more logs and a clustering method that clusters best against core depositional facies; and
        a classification of the clusters into the core depositional facies using one or more predetermined rules.

2. The method of claim 1 wherein the log inclusion optimization identifies which clustering method clusters best against core depositional facies and defines an optimum input combination of logs to use among the one or more logs to cluster best against core depositional facies.

3. The method of claim 2 wherein the log inclusion optimization identifies a best clustering method by testing one or more clustering methods in a supervised mode, comparing one or more outputs of a clustering method with reference clustering output, and selecting the best clustering method based on the comparing.

4. The method of claim 1 wherein the petrophysical clustering delineates petrophysical clusters using an unsupervised mode and the number of clusters is defined using a gap statistic operation.

5. The method of claim 1 wherein the one or more predetermined rules include one or more of:
    an occurrence rule;
    a thickness rule;
    a stratigraphic position rule; and
    a likely pattern rule.

6. The method of claim 5 wherein the occurrence rule is based on a probability of one predicted cluster corresponding to one depositional facies, and wherein the probability is compared to a predetermined threshold.

7. The method of claim 5 wherein the thickness rule is applied for predicted facies corresponding to thin layers or to layers with few continuous data samples, and automatically assigns these petrophysical clusters to depositional facies above or below which has a larger thickness.

8. The method of claim 5 wherein the stratigraphic position rule is applied when a formation is divided in stratigraphic intervals with specific depositional facies and is based on weighted probability of a petrophysical cluster matching one core facies.

9. The method of claim 5 wherein the likely pattern rule assigns petrophysical clusters based on statistically significant patterns or sequences of core depositional facies.

10. A method comprising:
    using machine learning for sedimentary facies prediction based on one or more logs acquired in a borehole, by performing, via one or more processors of a computing system:
    data management comprising:
        depth matching or resampling, comprising:
            depth-shifting measurement logs against a gamma ray (GR) or other reference log; and
            depth-matching core facies descriptions by comparing a core GR to the GR log or the other reference log or using image logs;
        data normalization and outlier handling, comprising:
            normalizing well logs or calculated curves; and
            collapsing a predetermined percentile of outliers into first and last categories or bins of the normalized well logs or calculated curves;
        missing data handling comprising:
            discarding absent values representing less than a predetermined percentage of data; and
            reconstructing a petrophysical log from other petrophysical measurements using one or more supervised learning algorithms or via computation using empirical equations; and
        balanced data set distribution comprising correcting unbalanced data using weighted averaging;
    a petrophysical clustering of borehole depths, wherein the borehole depths are gathered into clusters based on similarities in the one or more logs, wherein the petrophysical clustering comprises an unsupervised learning technique, wherein the one or more logs represent formation characteristics versus depth, and wherein the data management is performed before the petrophysical clustering;
    a log inclusion optimization, including a selection of one or more parameters of the petrophysical clustering using a supervised learning technique that is based on comparing predicted facies labels to true facies labels, wherein the one or more parameters include a number and type of considered logs among the one or more logs and a clustering method that clusters best against core depositional facies; and
    a classification of the clusters into the core depositional facies using one or more predetermined rules, wherein the core depositional facies are based on core samples.

11. The method of claim 10 wherein the log inclusion optimization identifies which clustering method clusters best against core depositional facies and defines an optimum input combination of logs to use among the one or more logs to cluster best against core depositional facies.

12. The method of claim 11 wherein the log inclusion optimization identifies a best clustering method by testing one or more clustering methods in a supervised mode, comparing one or more outputs of a clustering method with reference clustering output, and selecting the best clustering method based on the comparing.

13. The method of claim 10 wherein the petrophysical clustering delineates petrophysical clusters using an unsupervised mode and the number of clusters is defined using a gap statistic operation.

14. The method of claim 10 wherein the one or more predetermined rules include one or more of:
    an occurrence rule;
    a thickness rule;
    a stratigraphic position rule; and
    a likely pattern rule.

15. The method of claim 14 wherein the occurrence rule is based on a probability of one predicted cluster corresponding to one depositional facies, and wherein the probability is compared to a predetermined threshold.

16. The method of claim 14 wherein the thickness rule is applied for predicted facies corresponding to thin layers or to layers with few continuous data samples, and automatically assigns these petrophysical clusters to depositional facies above or below which has a larger thickness.

17. The method of claim 14 wherein the stratigraphic position rule is applied when a formation is divided in stratigraphic intervals with specific depositional facies and is based on weighted probability of a petrophysical cluster matching one core facies.

18. The method of claim 14 wherein the likely pattern rule assigns petrophysical clusters based on statistically significant patterns or sequences of core depositional facies.

19. A method comprising:
    using machine learning for sedimentary facies prediction based on one or more logs acquired in a borehole, by performing, via one or more processors of a computing system:
    data management comprising:
        depth matching or resampling, comprising:
            depth-shifting measurement logs against a gamma ray (GR) or other reference log; and
            depth-matching core facies descriptions by comparing a core GR to the GR log or the other reference log or using image logs;
        data normalization and outlier handling, comprising:
            normalizing well logs or calculated curves; and
            collapsing a predetermined percentile of outliers into first and last categories or bins of the normalized well logs or calculated curves;
        missing data handling comprising:
            discarding absent values representing less than a predetermined percentage of data; and
            reconstructing a petrophysical log from other petrophysical measurements using one or more supervised learning algorithms or via computation using empirical equations; and
        balanced data set distribution comprising correcting unbalanced data using weighted averaging;
    a petrophysical clustering of borehole depths delineating petrophysical clusters using an unsupervised mode and the number of clusters is defined using a gap statistic operation, wherein the borehole depths are gathered into clusters based on similarities in the one or more logs using an unsupervised learning technique, wherein the one or more logs represent formation characteristics versus depth, and wherein the data management is performed before the petrophysical clustering;
    a log inclusion optimization identifying which clustering method clusters best against core depositional facies, and defining an optimum input combination of logs to use among the one or more logs to cluster best against core depositional facies, including a selection of one or more parameters of the petrophysical clustering using a supervised learning technique, wherein the one or more parameters include a number and type of considered logs among the one or more logs and a clustering method that clusters best against core depositional facies; and a classification of the clusters into the core depositional facies using one or more predetermined rules.

20. The method of claim 19 wherein the log inclusion optimization identifies a best clustering method by testing one or more clustering methods in a supervised mode, comparing one or more outputs of a clustering method with reference clustering output, and selecting the best clustering method based on the comparing.

* * * * *